W. J. LANDON.
SPEED INDICATOR.
APPLICATION FILED JAN. 21, 1914.

1,149,453.

Patented Aug. 10, 1915.

WITNESSES:
F. C. Matheny
A. Haskins

INVENTOR
William J Landon
BY
C. W. Haskins
ATTORNEY

UNITED STATES PATENT OFFICE.

WILLIAM J. LANDON, OF SEATTLE, WASHINGTON.

SPEED-INDICATOR.

1,149,453.   Specification of Letters Patent.   Patented Aug. 10, 1915.

Application filed January 21, 1914. Serial No. 813,574.

*To all whom it may concern:*

Be it known that I, WILLIAM J. LANDON, citizen of the United States, residing at Seattle, in the county of King and State of Washington, have invented a certain new and useful Improvements in Speed-Indicators, of which the following is a specification.

My invention relates to improvements in signaling devices and more particularly it relates to improvements in signaling devices for motor vehicles as automobiles, motor-cycles, and the like, and the object of my improvement is to provide signaling appliances connected with a speedometer that may be associated with the wheel of a vehicle, in a manner well known, whereby when such vehicle shall travel at a rate of speed that is faster than a predetermined rate of speed then the speedometer will operate to actuate the signaling device to display a distinctive signal, as a colored light or a semaphore disk, to indicate that the vehicle is traveling at a rate of speed greater than such predetermined rate of speed.

I accomplish this object by devices illustrated in the accompanying drawings in which—

Figure 1:
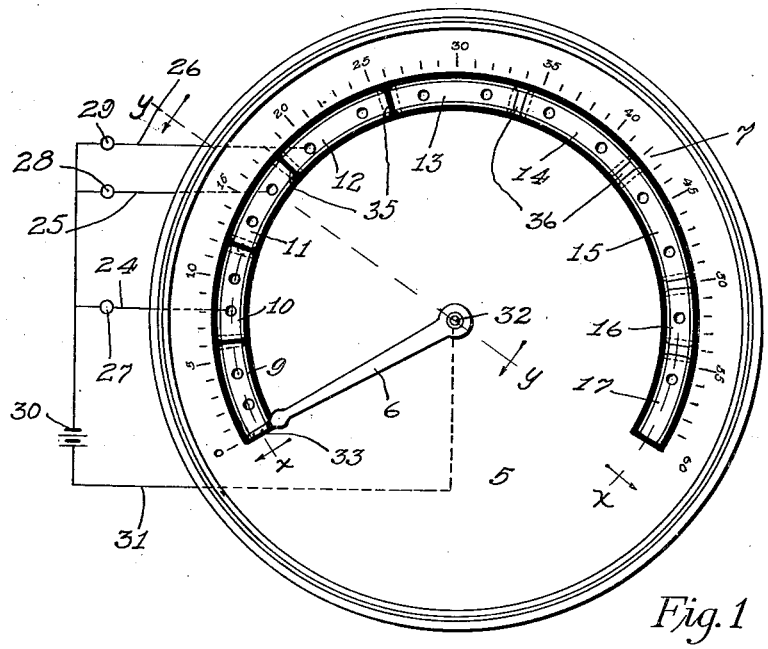
Figure 2:
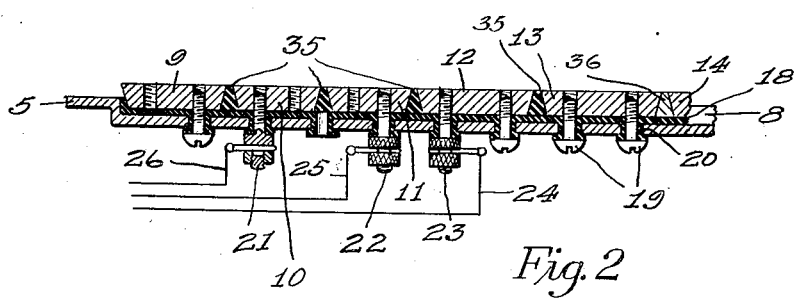

Figure 1 is a diagrammatical plan view of a speedometer and its associated signaling system embodying my invention; Fig. 2 is a fragmentary view in cross-section of the dial plate of the same, on broken line $x$, $x$ of Fig. 1, and Fig. 3 is a fragmentary view in cross-section on broken line $y$, $y$ of Fig. 1.

Referring to the accompanying drawings, throughout which like reference numerals indicate like parts, 5 is the dial of a speedometer which speedometer may be connected by the usual flexible shaft and gearing (not shown) with the wheel of a motor vehicle and is provided with a movable pointer 6 that is adapted to move over a scale 7 to indicate the number of miles per hour at which the vehicle is traveling.

Figure 3:
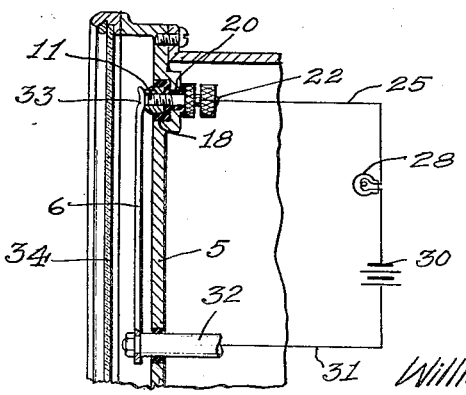

The dial 5 is provided with a circular slot 8 in which slot 8 may be disposed a plurality of contact members 9, 10, 11, 12, 13, 14, 15, 16 and 17 such contact members being insulated from the dial 5 by insulating material 18 and secured within the slot 8 by insulated screws 19, 19 that extend upwardly through the insulating material 18, as more clearly shown in Figs. 2 and 3.

A plurality of binding posts 21, 22 and 23 are connected each with a different one of contact members 10, 11 and 12 which are each connected by wires 24, 25 and 26, respectively, with one terminal of lamps 27, 28 and 29, respectively, the other terminal of each of which lamps 27, 28 and 29 is connected with the same terminal of a battery 30 whose other terminal is connected by a conductor 31 with the pivot shaft 32 on which the pointer 6 is mounted, as shown in Fig. 2, such pointer 6 being formed with a curved contact portion 33 on its outer end which is adapted to move over and engage with the contact members 9 to 17 inclusive, such pointer 6 thus serving as a switch arm to open or close at required times the several circuits in which are connected the lamps 27, 28 and 29.

A glass cover 34 is provided to cover the dial 5 to protect the dial 5, the pointer arm 6, and the contact members 9 to 17 inclusive and to prevent such parts from being tampered with.

The contact members 9 to 17 inclusive, are of different lengths and may be insulated from each other by pieces of insulating material 35, 35 or if desired they may be electrically connected with each other by wedge shaped pieces 36, 36, as clearly shown in Figs. 1 and 2, the insulating pieces 35 and the metal conductors 36 being of the same shape to be interchangeable, thus such contact members may be put together in any desired combination in order that a desired one of the signal lights may be lighted when a speed of a predetermined number of miles per hour is reached, and further, in order that such light may remain lighted unless such rate of speed be decreased to a degree below such predetermined number of miles per hour or be increased to exceed another predetermined number of miles per hour. Thus if the vehicle is moving at a rate of six miles per hour or less, the pointer 6 will contact with the member 9 and no lamp will be lighted but if such vehicle is moving at a rate of more than six miles per hour and not over twelve miles per hour the pointer 6 will contact with the member 10 to complete the circuit in which is connected the lamp 27 thus causing said lamp 27 to be lighted, such lamp 27 remaining lighted though the speed of the vehicle be increased until such speed shall reach twelve miles per hour, at which speed the pointer arm 26 will pass over the insulating strip 35 that separates the members 10 and 11 thus breaking contact with the member 10 and making contact with the member 11 to complete the circuit in which is connected the lamp 28 to cause such lamp 28 to be lighted, and if the speed of the vehicle be increased to more than eighteen miles per hour the pointer arm 6 will pass from the member 11 to the member 12 thus breaking the circuit in which is connected the lamp 28 and completing the circuit in which is the lamp 29, which lamp 29 will remain lighted until a speed of more than twenty six miles per hour is attained.

If it is desired to connect more lamps in circuit with the battery 30 to indicate other different degrees of speed, then, obviously, they may be each connected with a different one of the remaining contact members in the same manner in which the lamps 27, 28 and 29 are connected with the respective members 10, 11 and 12, such remaining contact members 13, 14, 15, 16 and 17 being insulated from each other instead of being electrically connected together as illustrated in Fig. 1.

The contact members 9 to 17 inclusive, may be made of any desired length, as illustrated in Fig. 1, whereby they may cause a lamp that is connected therewith to be lighted in response to a variation in speed of any desired rate as, for instance, the member 10 is of such length that a variation in speed of x miles per hour is required to cause the pointer arm 6 to move from one end to the opposite end of such member 10, while the member 12 is of sufficient length to include a variation in speed of eight miles per hour, and the member 16 will only include a variation in speed of four miles per hour. Obviously such members may be made of any length to meet various requirements.

The insulating pieces 35 and the conductor pieces 36, being of the same size and shape, may be interchanged to secure a variation in the signals as, for instance, if the insulator 35 between the members 12 and 13 be interchanged with the connector 36 between the members 14 and 15 then the lamp 29 will be lighted at all times when the speed of the vehicle ranges from eighteen to thirty four miles per hour.

The lamps 27, 28 and 29 may preferably each be constructed to show a light of a different color in order that a person outside of the vehicle may determine at a glance what rate of speed is being exceeded by such vehicle in its movement and such lamps and the speedometer may be disposed in a casing or box and the box sealed to prevent the mechanism being tampered with, if it be found advantageous to do so.

Manifestly numerous changes in the form of construction of various details, and the arrangement of various parts embodied in my signaling system, may be made without departing from the spirit of my invention or sacrificing any of its advantages.

What I claim is:

A device of the class described, comprising a circular base having a series of openings arranged on an arc, an insulator plate carrying tubular bosses adapted for seating on said base with the bosses positioned in the base openings, spaced arcuate contact plates mounted on said insulator plate and positioned above the base openings, there being openings in said contact plates registering with said tubular bosses, headed screws passing through said base plate openings and tubular bosses and having threaded engagement with said contact plates, an indicator hand contacting said contact plates, a battery in circuit with said contact plates and indicator hand, and means selectively positioned between the ends of said contact plates to connect certain ones of said plates in series.

In testimony whereof, I, hereunto subscribe my name this fifteenth day of January A. D., 1914.

WILLIAM J. LANDON.

Witnesses:
VERAH M. LANDON,
LELIA P. JUDGE.